United States Patent

Nakamura et al.

[15] 3,705,412

[45] Dec. 5, 1972

[54] DUPLEX INTERPHONE

[72] Inventors: Isao Nakamura, Saitama-ken; Hiroshi Matsuzaki, Tokyo, both of Japan

[73] Assignee: Tokyo Shibaura Electric Co., Ltd. Kawasaki-shi, Japan

[22] Filed: Nov. 16, 1970

[21] Appl. No.: 89,992

[30] Foreign Application Priority Data

Nov. 19, 1969 Japan ..............................44/109198
June 29, 1970 Japan ..............................45/56387

[52] U.S. Cl. ..............................179/37, 179/1 H
[51] Int. Cl. ..............................H04m 9/08
[58] Field of Search.....179/15 FD, 2.5 R, 1 H, 1 CN, 179/37; 178/58 R, 58 A

[56] References Cited

UNITED STATES PATENTS

| | | | |
|---|---|---|---|
| 1,862,137 | 6/1932 | Curtis | 179/2.5 R |
| 2,535,446 | 12/1950 | Mitchell | 179/2.5 R |
| 2,476,880 | 7/1949 | Lenehan | 179/2.5 R |
| 2,634,334 | 4/1953 | Kalb | 179/2.5 R |
| 3,475,561 | 10/1969 | Krasin | 179/2.5 R |

FOREIGN PATENTS OR APPLICATIONS

| | | | |
|---|---|---|---|
| 215,743 | 12/1955 | Australia | 179/2.5 R |

*Primary Examiner*—Kathleen H. Claffy
*Assistant Examiner*—Thomas D'Amico
*Attorney*—Flynn & Frishauf

[57] ABSTRACT

A duplex interphone wherein a master station and substation each having a microphone and a receiver are interconnected through two exclusive communication lines. The audio signal produced by the microphone in the master station is transmitted through said two communication lines in the form of a modulated carrier signal or audio signal. The audio signal produced by the microphone in the sub-station, on the other hand, is transmitted through said two communication lines in the form of a modulated carrier signal or audio signal having a different frequency band than that of the signal transmitted from the master to sub-station. The transmitted audio signal or the audio signal derived by demodulating the transmitted modulated carrier signal is used to drive the receiver in the master station or sub-station.

11 Claims, 6 Drawing Figures

DUPLEX INTERPHONE

The present invention relates to an interphone capable of effecting simultaneous transmission and reception between a master station and a sub-station, and more particularly to a duplex interphone wherein at least one of the master station and the sub-station thereof is equipped with a hand set.

The duplex interphone has been widely used. When it is used for domestic use, for example, a master station having a hand set is installed in a house while a sub-station is installed at a front-door. Since both the master station and the sub-station are so arranged as to allow transmission and reception of audio signals, communication between a guest and a housekeeper may be achieved.

In many of the prior art duplex interphones, the master station and the sub-station are interconnected through three wires, in which case one wire is used in common. The audio signal produced by a microphone or transmitter in the master station is amplified by an amplifier in the master station. The amplified signal is then transmitted through the common wire and one of the remaining wires to the sub-station for driving a speaker or receiver in the sub-station. The audio signal produced by a microphone or transmitter in the sub-station, on the other hand, is transmitted through the common wire and the remaining wire for driving a receiver in the hand set of the master station. In this way two communication circuits are formed by two wires and a common wire in the three-wire system so that simultaneous communication between the master station and the sub-station is rendered possible.

A bell or a chime is frequently used for domestic use to inform a housekeeper of the visit of a guest. The bell or chime is usually connected through two wires with a push button mounted in a front-door or a gate.

Thus, when it is desired to change the bell or chime to the three-wire duplex interphone, the existing two wires cannot be utilized as they are. From this standpoint a two-wire duplex interphone is highly desirable.

The two-wire duplex interphone as well as three-wire one have been proposed. In such a two-wire duplex interphone, a pair of electric power lines are utilized as communication lines and the transmission of the signal is accomplished via a carrier wave having a considerably higher frequency than the source frequency. In such an interphone, however, noise voltages caused by electrical equipments are picked up by the interphone through the electric power lines, which noise disturbs the communication.

It is, therefore, an object of the present invention to provide an interphone capable of effecting simultaneous communication between a master station and a sub-station through two communication lines.

It is another object of the present invention to provide and interphone capable of effecting simultaneous communication between a master station and a plurality of sub-stations.

SUMMARY OF THE INVENTION

In accordance with the present invention, there is provided a duplex interphone comprising a first transmission and reception station having a first transmitter and a first receiver; a second transmission and reception station having a second transmitter and a second receiver and connected to the first transmission and reception station through a pair of communication lines; means for converting the audio signal produced by said first transmitter to a signal having a first frequency band and transmitting it to the second transmission and reception station through said pair of communication lines; means for re-converting said signal having the first frequency band transmitted by said transmitting means to an audio signal to supply it to said second receiver; means for converting the audio signal produced by said second transmitter to a signal having a second frequency band other than said first frequency band and transmitting it to said first transmission and reception station through said pair of communication lines; and means for supplying the signal transmitted to said first transmission and reception station to the first receiver as an audio signal. Each of the first and second transmission and reception stations includes a series circuit comprising a high frequency choke coil and a high frequency bypass condenser connected between the pair of communication lines, and either one of the transmission and reception stations includes a D.C. power supply, the D.C. power supply being connected to the junction of the coil and condenser in one of the series circuits, whereby the power voltage is derived from the junction of said coil and condenser in the other of said series circuits.

The present invention can be more fully understood from the following detailed description when taken in connection with the accompanying drawings, in which.

Figure 1:
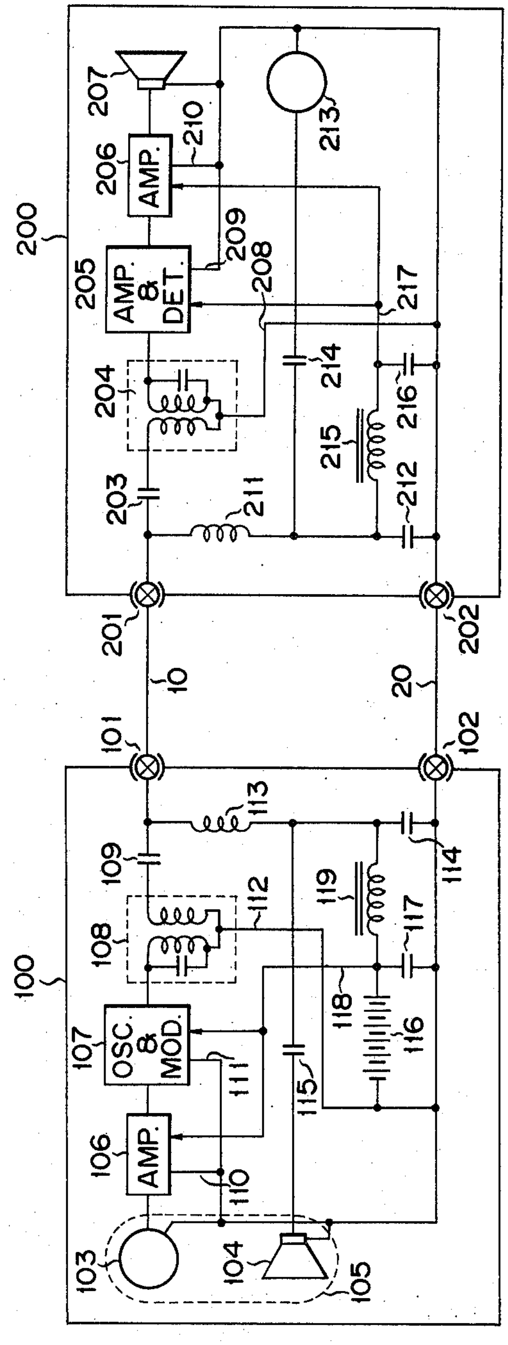
FIG. 1 is a circuit diagram of a duplex interphone in accordance with one embodiment of the present invention.

Referring to FIG. 1, the reference numeral 100 designates a master station having external terminals 101 and 102, which is one of the transmission and reception stations, and the reference numeral 200 designates a sub-station having external terminals 201 and 202, which is the other of the transmission and reception stations. The external terminals 101 and 201, and 102 and 202 are interconnected by wires 10 and 20, respectively.

The master station 100 is equipped with a hand set 105 which is releasable with respect of the master station housing and includes a carbon microphone 103 and a receiver or speaker 104. One terminal of the carbon microphone 103 in the hand set 105 is connected through an amplifier 106, an oscillator and modulator 107, a high frequency band pass filter 108 and a condenser 109 which exhibits small impedance for high frequency, in this order, to one of the external terminals 101, while the other terminal of the microphone 103 is connected to the other external terminal 102. The common lines or ground lines 110, 111 and 112 of the amplifier 106, the oscillator and modulator 107 and the band pass filter 108 are connected to the external terminal 102, respectively.

There is connected between the external terminals 101 and 102 a series circuit comprising a high frequency choke coil 113 which exhibits large impedance for the modulated carrier signal or high frequency signal and a high frequency by-pass condenser 114 which exhibits small impedance for a high frequency signal. Connected between the junction of the coil 113 and the condenser 114 and one terminal of the receiver or speaker 104 in the hand set 105 is a capacitor 115 which exhibits small impedance for low frequency signals or audio frequency signals. The other terminal of the receiver or speaker 104 is connected with the external terminal 102.

There is included in the master station 100 a D.C. power source 116 for operating the amplifier 106 and the oscillator and modulator 107 of the master station. Although a battery is shown in the drawing as such a power source, it will be apparent that another D.C. source produced by rectifying A.C. voltage may be utilized. The negative terminal of the power source 116 is connected with the external terminal 102 and a condenser 117 is connected between the positive terminal of the power source 116 and the external terminal 102. From the junction of the power source 116 and the condenser 117, a supply voltage is applied to the amplifier 106 and the oscillator and modulator 107 through the line 118. There is connected between the positive terminal of the power source 116 and the junction of the coil 113 and the by-pass condenser 114 a low frequency choke coil 119 having a larger impedance than the condenser 115 at audio frequencies for supplying the D.C. voltage to the sub-station 200 through the wires 10 and 20 and preventing the audio frequency signal from being superimposed on the supply voltage and applied to the amplifier 106 and the oscillator and modulator 107 in the master station 100.

In the sub-station 200, on the other hand, the external terminal 201 connected with the external terminal 101 of the master station via the wire 10 is connected through a condenser 203, a high frequency band pass filter 204, a high frequency amplifier and detector 205 and a power amplifier 206 to one terminal of a receiver or speaker 207 mounted in the sub-station 200, the other terminal of the receiver 207 being connected to the other external terminal 202 of the sub-station 200 connected to the external terminal 102 of the master station via the wire 20. The common lines or ground lines 208, 209 and 210 of the band pass filter 204, the high frequency amplifier and detector 205 and the power amplifier 206 are connected with the external terminal 202, respectively.

Connected in series between the external terminals 201 and 202 are a high frequency choke coil 211 which exhibits large impedance for high frequency signals and a high frequency by-pass condenser 212 which exhibits small impedance for high frequency signals. Connected between the junction of the coil 211 and the condenser 212 and one terminal of the carbon microphone 213 mounted in the sub-station is a condenser 214 which exhibits small impedance for audio frequencies. There is provided a low frequency choke coil 215 which exhibits large impedance for audio frequency signals, one terminal of which being connected with the junction of the coil 211 and the condenser 212 and another terminal being connected to the external terminal 202 via a condenser 216.

The choke coil 215 supplies the D.C. voltage fed from the master station 100 to the amplifier and detector 205 and the power amplifier 206 in the sub-station 200 by a line 217 and prevents the superimposition of the audio signal produced by the transmitter 213 in the sub-station 200 on the D.C. voltage applied to the amplifier and detector 205 and the power amplifier 206.

The operation of the two-wire duplex interphone shown in FIG. 1 will be described below. Communication is started by depressing a push button mounted in the sub-station and thereby a call circuit provided in the master station is actuated to cause the speaker or receiver in the hand set to produce a call tone. After the call tone has been produced, if the hand set is picked up from the master station housing, the interphone is switched from a call waiting state to a communication state by the action of a hook switch. Since means for performing such a function is not directly related to the present invention it is omitted from FIG. 1.

With the communication from the master station to the sub-station, an audio signal having a voltage level of 1 to 10 mV is produced in the carbon microphone 103 of the hand set 105 by talker's sound at the master station 100. This audio signal is amplified by the amplifier 106 to a level suitable for the subsequent modulation. The output signal from the amplifier 106 modulates a carrier signal in amplitude or frequency in the modulator 107. In this case amplitude modulation is preferred because amplitude modulation is simpler than frequency modulation with respect to the modulator construction. In the drawing, a modulator and an oscillator are shown in a common block. This may be accomplished by means of collector modulation, for example, wherein an audio signal or modulating signal is applied to a collector of a transistor oscillator. It should be understood, however, that an oscillator and a modulator may be provided separately. In the present embodiment, in view of audio frequency and radio frequency, the carrier frequency may be an intermediate frequency between both aforesaid frequencies of the order of, for example, 140 KHz.

The modulated carrier signal is fed to the communication lines 10 and 20 via the band pass filter 108 tuned to the carrier frequency and the condenser 109. In this case, due to the high frequency coil 113 and the high frequency by-pass condenser 114 connected across the external terminals 101 and 102, feedback of the modulated carrier signal or high frequency signal to the amplifier 106 and the modulator 107 through the power supply line 118 is prevented.

The modulated carrier signal transmitted to the sub-station 200 is applied to the band pass filter 204 and the high frequency amplifier and detector 205 through the condenser 203 which exhibits sufficiently smaller impedance than the coil 211 at the carrier frequency. The detected output signal is amplified by the power amplifier 206 to the level of about 50 mW and then drives the speaker 207.

For communication from the sub-station to the master station, the audio signal produced by the microphone 213 in the sub-station 200 and having a level of 1 to 10 mV is fed to the communication lines 10 and 20 through the condenser 214 which exhibits small impedance at audio frequencies and the coil 211. In this case, due to the low frequency choke coil 215 the application of audio signals to the detector 205 and the power amplifier 206 is prevented.

The audio signal transmitted to the master station 100 drives the speaker or receiver 104 in the hand set 105 through, the coil 113 which exhibits smaller impedance than the condensers 109 and 114 at audio frequency and the condenser 115, producing an audio output of about 1 mW. In this case, due to the low frequency choke coil 119 the application of this audio signal to the amplifier 106 and the modulator 107 is prevented.

From the foregoing description, it will be appreciated that duplex communication between the master station and the sub-station can be effected.

In the embodiment of the present invention shown in FIG. 1, the signal from the master station is finally power amplified in the sub-station for driving the speaker. Thus, a relatively large amount of electric power must be supplied from the master station to the sub-station and hence long communication lines would suffer a disadvantage from the standpoint of power loss in the communication lines. Also, since the audio signal produced by the microphone in the sub-station is transmitted to the master station as it is for driving the speaker of the master station, it is difficult to connect a plurality of sub-stations to a common master station to effect simultaneous communication therebetween.

Figure 2:
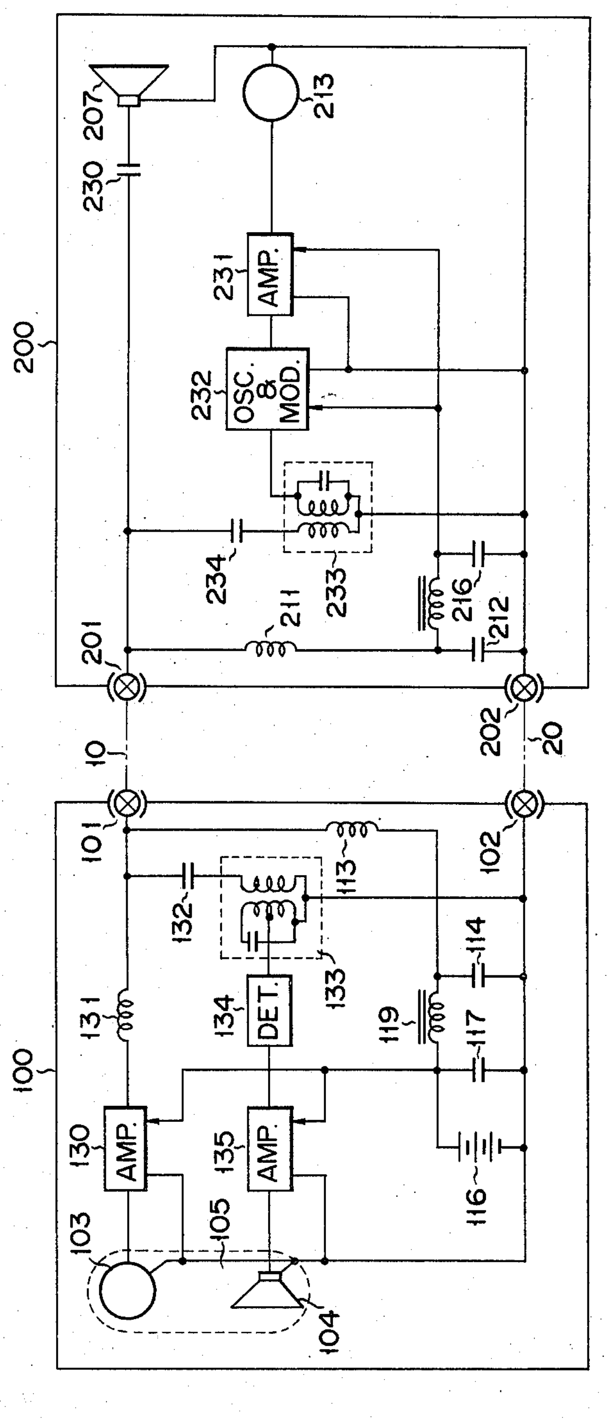
FIG. 2 is a circuit diagram of a duplex interphone in accordance with another embodiment of the present invention.

In order to eliminate such disadvantage the embodiment of the present invention of FIG. 1 may be modified as shown in FIG. 2, wherein those parts which correspond to the parts in FIG. 1 are designated by the same reference numerals and the explanations thereof are omitted.

In the master station 100, there is connected to the carbon microphone 103 an amplifier 130 which amplifies the audio signal produced by the microphone 103. The coil 131 which exhibits low impedance at audio frequency may be connected between the amplifier 130 and the external terminal 101. There is also connected between the external terminals 101 and 102 the band pass filter 133 through the condenser 132 which exhibits high impedance at audio frequency and low impedance at high frequency. The output terminal of the filter 133 is connected to the audio amplifier 135 through the detector 134. The amplifier 135 is connected to the speaker or receiver 104 in the hand set 105 of the master station 100.

In the sub-station 200, on the other hand, the external terminal 201 is connected to the speaker 207 via the D.C. blocking condenser 230. One terminal of the carbon microphone 213 is connected to an oscillator and modulator 232 through an amplifier 231. The modulator 232 is connected to the external terminal 201 through the band pass filter 233 and the condenser 234 which exhibits high impedance at audio frequency and low impedance at high frequency. In practice the band pass filter 233 constitutes a part of the oscillator and modulator 232.

The operation of the embodiment shown in FIG. 2 will now be described. The audio signal produced by the carbon microphone 103 in the hand set 105 of the master station 100 and having a level of 1 to 10 mV is amplified by the amplifier 130 to a level of about 50 mW and then transmitted to the sub-station 200 via the pair of wires 10 and 20 for driving the speaker or receiver 207 in the sub-station. In this operation the audio signal amplified by the amplifier 130 in the master station 100 is prevented by the low frequency choke coil 119 from being feedback to the amplifiers 130 and 135, as in the case of the embodiment of FIG. 1.

In the sub-station 200, the audio signal produced by the carbon microphone 213 and having a level of 1 to 10 mV is amplified by the amplifier 231 to a level suitable for subsequent modulation. By the amplified audio signal, a carrier signal having the frequency of about 140 KHz is amplitude modulated in the modulator 232. The modulated carrier signal is then transmitted to the communication lines 10 and 20 through the condenser 234. In this operation, the feedback of the modulated carrier signal in the sub-station 100 to the modulator 232 and the amplifier 231 is prevented by the coil 211 and the condenser 212. Also, the application of the audio signal transmitted from the master station 100 to the sub-station 200, to the modulator 232 and the amplifier 231 is prevented by the low frequency choke coil 215. The modulated carrier signal transmitted from the sub-station 200 to the master station 100 is fed to the detector 134 through the band pass filter 133. The audio signal detected by the detector 134 is then amplified by the amplifier 135 for driving the speaker or receiver 104 in the hand set 105 to produce output of about 1 mW. The amplifier 135 is provided to compensate for the losses caused by the detector 134 in the master station 100 and the modulator 232 in the sub-station 200. The superposition of the modulated carrier signal transmitted to the master station 100 onto the supply voltage as well as the application thereof to the amplifiers 130 and 135 are prevented by the coil 113 and the high by-pass condenser 114.

Figure 3:
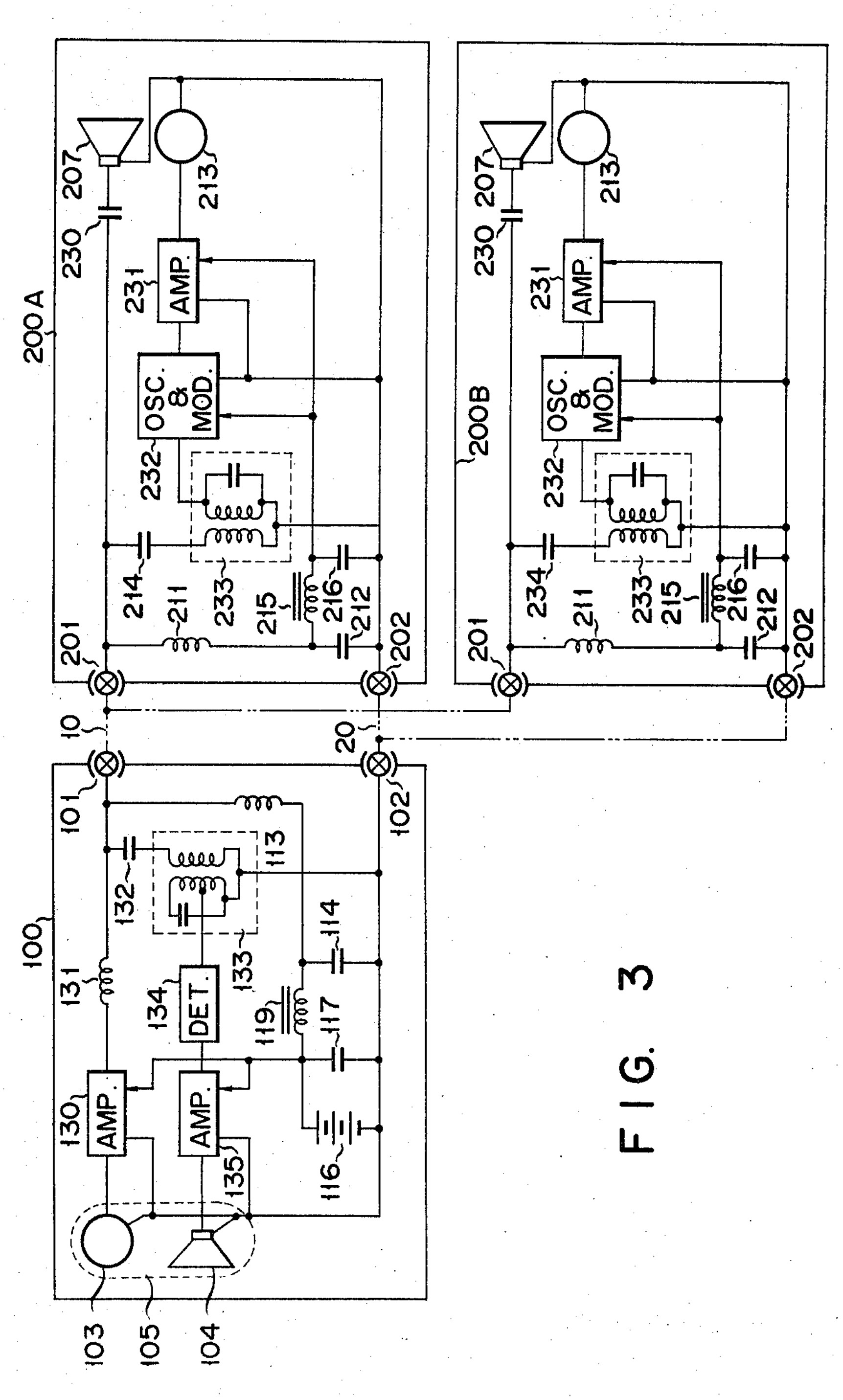
FIG. 3 is a circuit diagram of duplex interphone in accordance with a further embodiment of the present invention.

In the embodiment of FIG. 2, the audio signal produced by the transmitter 213 of the sub-station 200 is transmitted by the amplitude modulated carrier signal to the master station 100 so that a plurality of sub-stations 200A, 200B . . . may be connected in parallel as shown in FIG. 3. To this end, the carrier signals produced by each of the sub-stations should have different frequencies, the difference therebetween being larger than audio frequency, i.e. higher than at least 10 KHz. Thus it should be understood that the band width of the band pass filter 133 in the master station 100 should be made broader.

Figure 4:
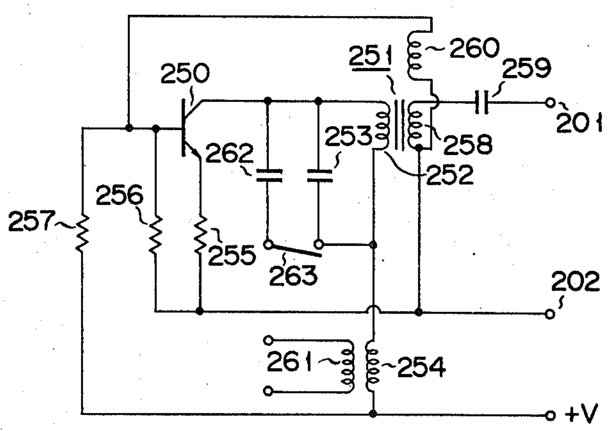
FIG. 4 is a circuit diagram of an oscillator and modulator in FIG. 3.
Figure 5:
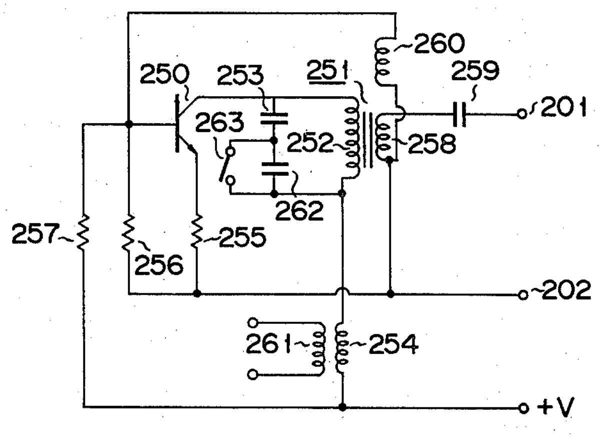
FIG. 5 is a modification of FIG. 4.

The circuit diagrams of the modulator and oscillator adapted to be used in the embodiment of FIG. 3 are shown in FIG. 4 and FIG. 5. In FIG. 4, a collector of an NPN transistor 250, for example, is connected through a first winding 252 of an oscillation transformer 251, across which a capacitor 253 is connected, and a modulating winding 254 to a supply voltage +V. The emitter and the base of transistor 250 are connected to the external terminal 202 of the sub-station through a resistor 255 and a resistor 256, respectively. The base of transistor 250 is also connected to the power supply through a resistor 257. One end of a second winding 258 of the oscillation transformer 251 is connected to the external terminal 202 while the other end is connected to the external terminal 201 through a condenser 259. One end of the third or feedback winding 260 is connected to the external terminal 202 while the other end is connected to the base of transistor 250. Such a circuit produces a carrier signal having a frequency determined by the coil 252 and the condenser 253, such as the frequency of 140 KHz in the previous example, and the carrier signal is amplitude modulated by the application of the modulating input to the winding 254 through the modulating input winding 261. The modulated carrier signal is then transmitted to an external terminal through the winding 258 and the condenser 259.

In FIG. 4 the second condenser 262 is also connected through a switch 263 in parallel with the first condenser 253. The capacitance value of the second condenser 262 is selected such that the frequency of the carrier signal produced under the parallel connection of the second condenser with the first condenser 253 on closing the switch 263 is lower than the frequency of the carrier signal produced under the existence of the coil 252 and the first condenser 253, by an amount more than audible frequency.

Thus, in the embodiment of FIG. 3 including the modulator and oscillator as shown in FIG. 4, the carrier signals produced by a plurality of sub-stations should have frequency differences larger than audible frequency from each other. Therefore, even when a plurality of modulated carrier signals from a plurality of sub-stations are simultaneously transmitted to the master station, no beat interference of audio frequency which otherwise interrupts the communication is produced.

Although the second condenser 262 is shown to be connected in parallel with the condenser 253, in FIG. 4, to lower the oscillation frequency, it is also possible, as shown in FIG. 5, to connect the first and the second condensers 253 and 262 in series and provide the switch 263 in parallel with the second condenser 262 to raise the oscillation frequency.

In the foregoing embodiments in order to effect duplex communication between the first and the second stations, the signals produced by each of the stations are arranged to have different frequency bands from each other such that one signal is the modulated carrier signal in which the carrier signal is modulated by the audio signal while the other signal is the audio signal itself. Thus, in order to effect duplex communication between the first and the second stations by utilizing the signals having different frequency bands from each other, the embodiment shown in FIG. 6 may be practically used although it is more complex than the foregoing embodiments.

Figure 6:
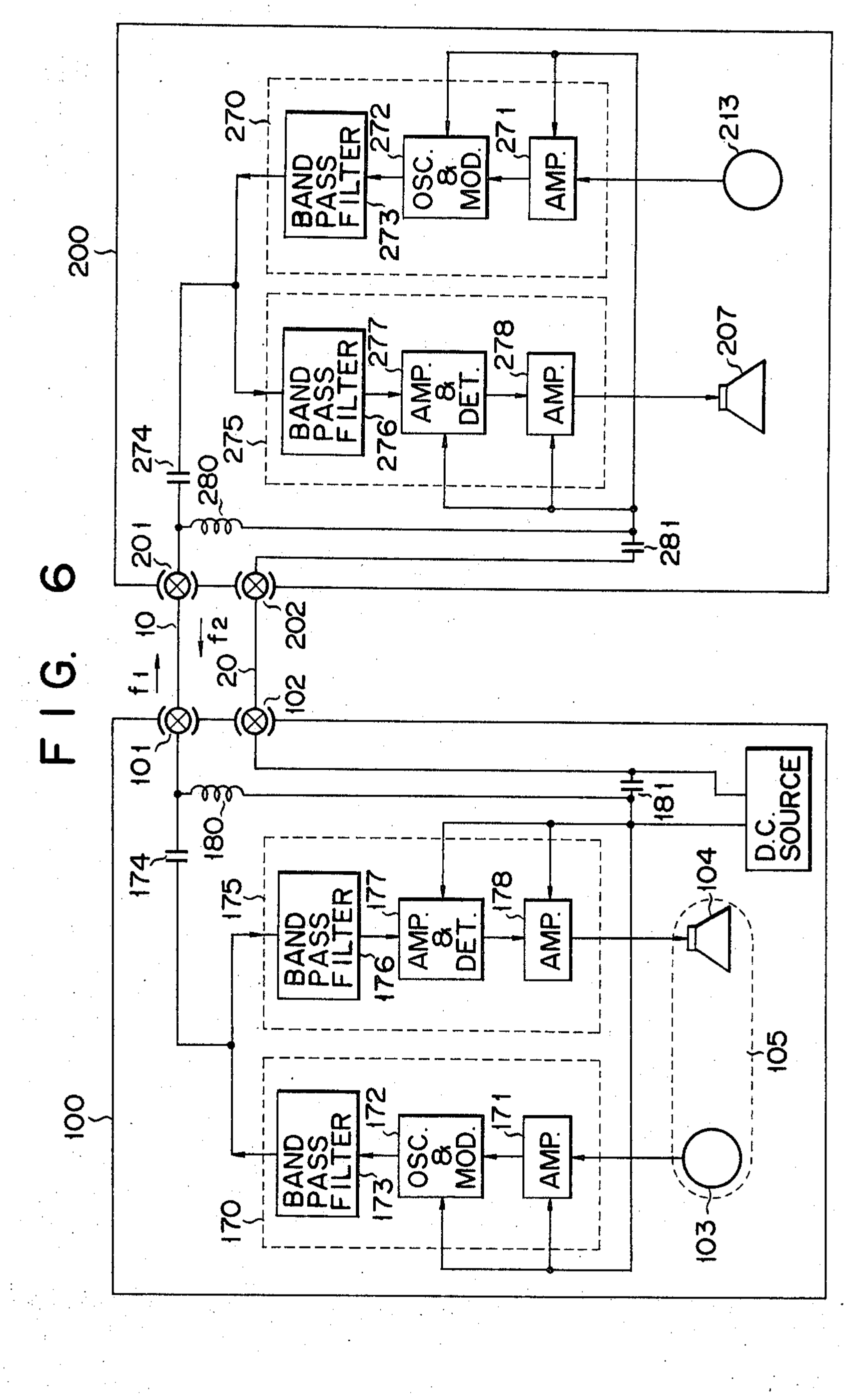
FIG. 6 is a circuit diagram of a duplex interphone in accordance with a further embodiment of the present invention.

In FIG. 6 the same parts as shown in FIG. 1 are designated similarly. The carbon microphone 103 in the hand set 105 of the master station 100 is connected to the external terminal 101 through a transmitter section 170 of the master station in which an amplifier 171, a modulator 172 and a band pass filter 173 are connected in series, and through a condenser 174. In the sub-station 200, the external terminal 201 connected via the wire 10 to the external terminal 101 of the master station 100 is connected through a condenser 274 to a receiver section 275 of the sub-station in which a band pass filter 276, an amplifier and detector 277 and a power amplifier 278 are connected in series. The receiver section 275 is connected to the speaker 207 in the sub-station 200. The carbon microphone 213 in the sub-station 200 is connected to the external terminal 201 through a transmitter section 270 of the substation 200 in which an amplifier 271, a modulator 272 and a band pass filter 273 are connected in series, and through the condenser 274. The external terminal 101 of the master station is connected to the speaker or receiver 104 through the condenser 174 and a receiver section 175 in the master station in which a band pass filter 176, an amplifier and detector 177 and a power amplifier 178 are connected in series. Between the external terminals 101 and 102 of the master station, a high frequency choke coil 180 and a high frequency by-pass condenser 181 are connected in series. Connected in parallel with the condenser 181 is a D.C. voltage supply 116, and the voltage at the junction of the condenser 181 and the coil 180 is supplied to the amplifier 171 and the modulator 172 in the transmitter section 170 of the master station and to the amplifier and detector 177 and the amplifier 178 in the receiver section 175. Connected in series between the external terminals 201 and 202 of the sub-station 200 are a high frequency choke coil 280 and a high frequency by-pass condenser 281, and the voltage at the junction of the coil 280 and the condenser 281 is supplied to the amplifier and detector 277 and the amplifier 278 in the receiver section 275 of the sub-station 200 and to the amplifier 271 and the modulator 272 in the transmitter section 270.

The operation of the embodiment of FIG. 6 is now described. The audio signal produced by the carbon microphone 103 in the hand set 105 of the master station 100 is amplified by the amplifier 171 and then used to amplitude modulate the carrier signal having the frequency $f_1$Hz in the modulator 172. The modulated carrier frequency is transmitted through the band pass filter 173 having the center frequency of $f_1$Hz and the condenser 174.

In the sub-station 200, the modulated carrier signal transmitted from the master station 100 is applied through the condenser 274 and the band pass filter 276 having the center frequency of $f_1$Hz to the amplifier and detector 277. The detected output signal is amplified by the amplifier 278 for driving the speaker or receiver 207. The audio signal produced by the carbon microphone 213 of the sub-station 200 is amplified by the amplifier 271 and then used to amplitude modulate in the modulator 272 the carrier signal having the frequency of $f_2$Hz which does not interfere with the carrier signal having the frequency of $f_1$Hz. The modulated carrier signal is transmitted through the band pass filter 273 having the center frequency of $f_2$Hz and the condenser 274.

In the master station 100, the modulated carrier signal transmitted from the sub-station 200 is applied through the condenser 174 and the band pass filter 176 having the center frequency of $f_2$Hz to the amplifier and detector 177. The detected output signal is amplified by the amplifier 178 for driving the speaker or receiver in the hand set 105. In this embodiment, the signals are transmitted in the form of modulated carrier signals having different carrier frequencies, and in each station there are provided means or filters for selecting the modulated carrier signals based on the carrier frequency to accomplish duplex intercommunication. It will be apparent that this embodiment also enables a plurality of sub-stations to connected in parallel to one master station.

What we claim is:

1. A duplex interphone comprising:

a first station having a D.C. power source; and a second station connected with said first station by a pair of lines;

said first and second stations including transmitters for producing audio signals, transmitting means connected with said transmitters for effecting in different frequency bands, between said first and second stations, transmission of communication signals corresponding to said audio signals, receiving means for receiving said communication signals transmitted through said pair of lines, receivers connected with said receiving means for reproducing said audio signals in accordance with outputs from said receiving means, and series circuits including a high frequency choke coil and a high frequency by-pass condenser and connected between said pair of lines;

said D.C. power source being connected to the junction of the choke coil and by-pass condenser of the series circuit included in said first station whereby the power voltage is derived from the junction of the choke coil and by-pass condenser of the series circuit included in said second station.

2. A duplex interphone according to claim 1 wherein the transmitting means included in at least one of said first and second stations includes a modulator means and a band-pass filter means connected in series with said modulator means, and the receiving means included in the station opposite to said at least one of said first and second stations includes a band-pass filter means and a detector means connected in series with said band-pass filter means.

3. A duplex interphone according to claim 1 wherein the transmitter and receiver in said first station are provided in a hand set.

4. A duplex interphone comprising a first transmission and reception station including a hand set having a first transmitter and a first receiver; a second transmission and reception station including a second transmitter and a second receiver and connected to said first station through a pair of communication lines; means included in said first station for modulating a carrier signal with an audio signal produced by said first transmitter; a first condenser included in said first station for supplying the modulated carrier signal from said modulating means via said pair of communication lines to said second station; a band pass filter included in said second station for selecting the modulated carrier signal transmitted from said first station; a second condenser included in said second station for permitting the application of said modulated carrier signal from said first station to said band pass filter; means for detecting said modulated carrier signal from said band pass filter; means for amplifying the detected output signal of said detecting means to drive said receiver in said second station; a first series circuit included in said first station and comprising a high frequency choke coil and a high frequency by-pass condenser connected between said pair of communication lines; a second series circuit included in said second station and comprising a high frequency choke coil and a high frequency by-pass condenser connected between said pair of communication lines; a condenser for feeding the audio signal produced by said second transmitter to the junction of said coil and condenser in said second series circuit; a condenser for feeding said audio signal transmitted from said second station to said first station, to said first receiver through the junction of said coil and condenser in said first series circuit; a power supply included in said first station for supplying power voltage to said modulating means included in said first station; means for applying the voltage of said power supply to the junction of said coil and condenser in said first series circuit; and means for supplying the voltage of said power supply in the first station to said amplifying means included in said second station from said junction of said coil and condenser in said second series circuit.

5. A duplex interphone comprising a first transmission and reception station including a hand set having a first transmitter and a first receiver; a second transmission and reception station connected to said station through a pair of communication lines and including a second transmitter and a second receiver; means included in said first station for amplifying the audio signal produced by said first transmitter and transmitting it to said second station via said pair of communication lines; a condenser included in said second station for supplying the audio signal transmitted from said first station to said second station, to said second receiver; means for modulating a carrier signal with the audio signal produced by said second transmitter in said second station; a condenser for supplying said modulated carrier signal from said modulating means to said first station via said pair of communication lines; a band pass filter included in said first station for selecting said modulated carrier signal; a condenser for supplying said modulated carrier signal transmitted from said second station to said first station, to said band pass filter; means for detecting said modulated carrier signal from said band pass filter; means for amplifying the detected output signal from said detecting means and supplying it to said first receiver; a first series circuit included in said first station and having a high frequency choke coil and a high frequency by-pass condenser connected between said pair of communication lines; a second series circuit included in said second station and having a high frequency choke coil and a high frequency by-pass condenser connected between said pair of communication lines; a power supply included in said first station for supplying power voltage to said amplifying means included in the first station; means for applying said power voltage to the junction of said coil and condenser in said first series circuit; and means for supplying the voltage of said power supply in said first station to said modulating means in said second station from the junction of said coil and condenser in said second series circuit.

6. A duplex interphone in accordance with claim 5 wherein a plurality of second transmission and reception stations are connected in parallel with said first transmission and reception station.

7. A duplex interphone in accordance with claim 6 wherein said plurality of second transmission and reception stations include means for changing the frequencies of the carrier signals modulated by the audio signals produced by said second transmitters.

8. A duplex interphone in accordance with claim 7 wherein said means for changing the frequencies of the carrier signals includes a coil and a first condenser connected in parallel with said coil which determine a frequency of carrier signal to be produced by said modulating means included in said second station, a second condenser to be connected in parallel with said coil, and switching means for effecting the connection of said second condenser with said coil.

9. A duplex interphone in accordance with claim 8 wherein said second condenser is connected in parallel with said first condenser and said coil, and said switching means is connected in series with said second condenser.

10. A duplex interphone in accordance with claim 8 wherein said second condenser is connected in series with said first condenser, and said switching means is connected in parallel with said second condenser.

11. A duplex interphone comprising a first transmission and reception station including a hand set having a first transmitter and a first receiver; a second transmission and reception station connected to said first transmission and reception station through a pair of communication lines and including a second transmitter and a second receiver, means for modulating a carrier signal having a first carrier frequency with the audio signal produced by said first transmitter; a first band pass filter for selectively passing the first modulated carrier signal from said modulating means; a first condenser for transmitting said modulated carrier signal from said first band pass filter to said second station via said pair of communication lines; a second band pass filter for passing the first modulated signal supplied to said second station; a second condenser for supplying said first modulated carrier signal to said second band pass filter; means for detecting said first modulated carrier signal from said second band pass filter; means for amplifying the detected output signal of said detecting means and supplying it to said second reveiver; means for modulating a second carrier signal having a second carrier frequency different from said first carrier frequency, by the audio signal produced by said second transmitter; a third band pass filter for selecting the second modulated carrier signal from said modulating means and transmitting said second modulated carrier signal to said pair of communication lines through said second condenser; a fourth band pass filter for selecting through said first condenser said second modulated carrier signal supplied to said first station through said pair of communication lines; means for detecting the second modulated carrier signal from said fourth band pass filter; means for amplifying the detected output signal of said detecting means and supplying it to said first receiver; a power supply included in said first transmission and reception station for supplying power voltage to said modulating means and amplifying means; a first series circuit included in said first station and connected between said pair of communication lines and having a high frequency choke coil and a high frequency by-pass condenser connected in parallel with said power supply; a second series circuit included in said second station and connected between said pair of communication lines and having a high frequency choke coil and a high frequency by-pass condenser; and means for supplying the power voltage to said modulating means and amplifying means in said second station from the junction of said condenser and coil in said second series circuit.

* * * * *